United States Patent
Liszt

(10) Patent No.: US 11,176,790 B1
(45) Date of Patent: Nov. 16, 2021

(54) PORTABLE DISTANCE NOTIFICATION SYSTEMS AND APPLICATIONS THEREOF

(71) Applicant: IDEAL INDUSTRIES LIGHTING LLC, Racine, WI (US)

(72) Inventor: Kory Liszt, Apex, NC (US)

(73) Assignee: IDEAL INDUSTRIES LIGHTING, LLC, Racine, WI (US)

(*) Notice: Subject to any disclaimer, the term of this patent is extended or adjusted under 35 U.S.C. 154(b) by 0 days.

(21) Appl. No.: 17/119,566

(22) Filed: Dec. 11, 2020

(51) Int. Cl.
| | | |
|---|---|---|
| *G08B 13/14* | (2006.01) | |
| *G08B 21/02* | (2006.01) | |
| *H04W 4/029* | (2018.01) | |
| *G09F 27/00* | (2006.01) | |
| *H04W 4/80* | (2018.01) | |
| *G08B 21/24* | (2006.01) | |

(52) U.S. Cl.
CPC ..... *G08B 13/1427* (2013.01); *G08B 21/0277* (2013.01); *G08B 21/24* (2013.01); *H04W 4/029* (2018.02); *H04W 4/80* (2018.02); *G09F 2027/001* (2013.01)

(58) Field of Classification Search
CPC ............ G08B 13/1427; G08B 21/0277; G09F 2027/001; H04W 4/029; H04W 4/80
USPC ...................................................... 340/686.6
See application file for complete search history.

(56) References Cited

U.S. PATENT DOCUMENTS

| | | | | |
|---|---|---|---|---|
| 5,298,883 | A * | 3/1994 | Pilney ....................... | G01S 3/24 340/573.2 |
| 5,892,447 | A * | 4/1999 | Wilkinson ......... | G08B 21/0286 340/573.4 |
| 7,375,629 | B1 * | 5/2008 | Moyer ................... | G08B 21/22 340/539.13 |
| 8,279,077 | B1 * | 10/2012 | Lift .................... | G08B 13/2402 340/686.6 |
| 8,289,170 | B2 * | 10/2012 | Pryor ................. | G08B 21/0225 340/573.4 |
| 10,372,234 | B2 * | 8/2019 | Wang ....................... | G06F 3/16 |
| 2006/0132304 | A1 * | 6/2006 | Cabell ................ | G08B 21/0266 340/539.23 |
| 2015/0161872 | A1 * | 6/2015 | Beaulieu ................. | G01S 17/06 340/686.6 |

* cited by examiner

*Primary Examiner* — John A Tweel, Jr.
(74) *Attorney, Agent, or Firm* — J. Clinton Wimbish; Nexsen Pruet, PLLC

(57) ABSTRACT

Distance notification systems are described herein which, in some embodiments, are wearable by a user to maintain proper social distancing in any environment. Additionally, distance notification systems described herein can be applied to motorized equipment and/or other machinery in efforts to maintain a safe workplace, such as in factories, construction sites, warehouses, and/or other logistics operations. In one aspect, a distance notification system comprises a signal component, and a receiving component for processing encoded signal generated by the signal component into system user notifications. The encoded signal has power in excess of a predetermined threshold within a set distance between the signal component and the receiving component, wherein less than 10 percent of system user notifications are produced by encoded signal reflected from one or more surfaces.

19 Claims, 4 Drawing Sheets

PORTABLE DISTANCE NOTIFICATION SYSTEMS AND APPLICATIONS THEREOF

FIELD

The present invention relates to portable distance notification devices and, in particular, to wearable devices that can assist individuals in maintaining safe social distancing.

BACKGROUND

With the development and outbreak of infectious respiratory diseases, such as severe acute respiratory syndrome (SARS) and COVID-19, proper social distancing has become critically important. However, public spaces are often crowded, rendering it difficult for people to recognize and maintain proper social distancing. Efforts to assist maintenance of proper social distancing have largely centered on floor markings and/or various physical barriers for directing people, such as customers in a store, to observe a minimum distance from others. While effective in some circumstances, these measures have several disadvantages. Floor markings and physical barriers are static in nature and, therefore, are only useful over a small areal footprint. Moreover, these measures have found limited application, generally only being employed in locations where lines form, such as stores, restaurants, and airport terminals. In view of these disadvantages, new solutions for directing and/or maintaining proper social distancing are needed.

SUMMARY

In view of the foregoing, distance notification systems are described herein which, in some embodiments, are wearable by a user to maintain proper social distancing in any environment. Additionally, distance notification systems described herein can be applied to motorized equipment and/or other machinery in efforts to maintain a safe workplace, such as in factories, construction sites, warehouses, and/or other logistics operations. In one aspect, a distance notification system comprises a signal component, and a receiving component for processing an encoded signal generated by the signal component into system user notifications. The encoded signal has power in excess of a predetermined threshold within a set distance between the signal component and the receiving component, wherein less than 10 percent of system user notifications are produced by the encoded signal reflected from one or more surfaces. As described herein, the encoded signal establishes a safety perimeter around an individual or object wearing the signal component. Moreover, system user notifications may take a variety of forms, including auditory, visual and/or vibratory notifications.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

A number of social distancing devices have been developed and placed on the market in response to COVID-19 and other communicable diseases. Many of these devices employ high frequencies (e.g. >1 GHz) in the radio frequency band to detect distance or location. Significant issues arise with such high frequencies in the form of multipath reflections. Multipath reflections are detected by receivers of the social distancing devices and can produce false results and/or other artifacts leading to erroneous user notifications. To address such notification errors, the systems employ algorithms and other complex computational solutions to filter out multipath signal. While effective, such solutions require significant processing power, which can increase cost of the notification devices and limit usable lifetimes between power source charging or replacement.

In contrast to these prior devices, distance notification systems described herein are operable to address multipath signal via setting predetermined power thresholds within a set distance between the signal component and the receiving component. The predetermined power threshold can differentiate multipath signal from the desired line of sight (LoS) signal originating from the signal component. In some embodiments, less than 10 percent or less than 5 percent of system user notifications are produced by encoded signal reflected from one or more surfaces. The use of predetermined signal power thresholds described herein dispense with the requirements of high processing power and complex mathematical solutions to effectively filtering multipath signal.

Figure 1:
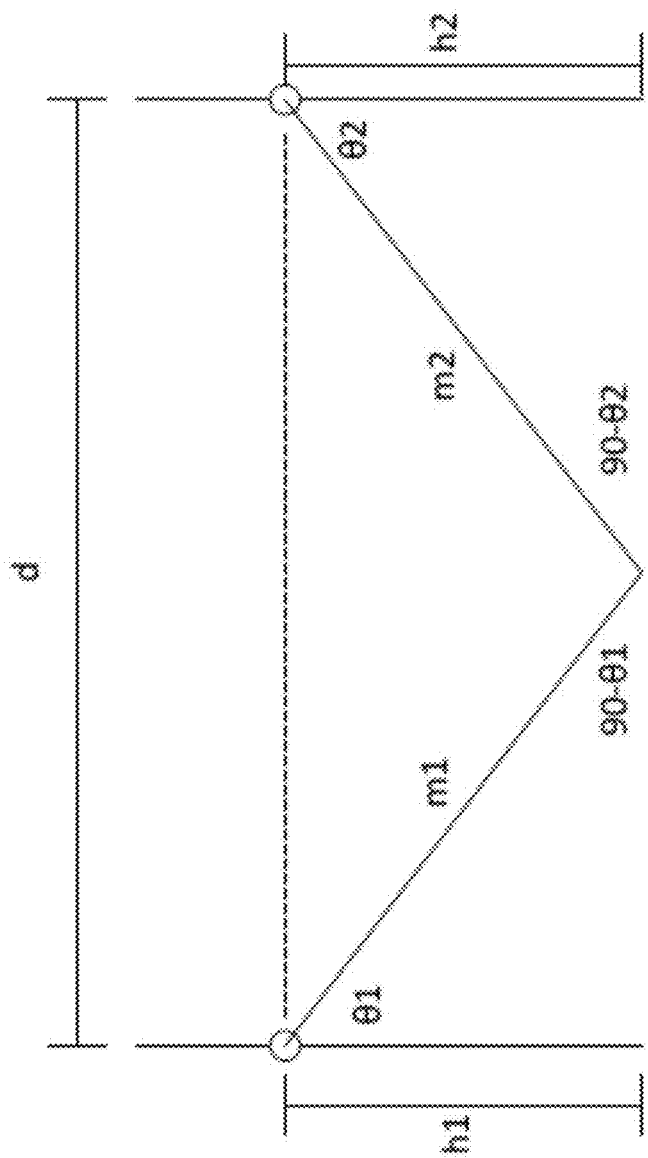
FIG. 1 illustrates a geometry for a multipath communication when two radios are within close proximity such that only one reflection is achieved based off the frequency defined by the design.

When in close proximity, radio wave reflections and subsequent path losses can be calculated to determine a threshold value that can be used to differentiate between a reflection vs direct line of sight communications. This calculation combines geometry and free space path loss formulas to identify the loss of each signal in decibels (dB) relative to its expected path and determine the delta between the two. FIG. 1 shows the typical geometry for a multipath communication when two radios are within close proximity such that only one reflection is achieved based off the frequency defined by the design. Assuming the reflection surface provides an ideal reflection for radio waves, the multipath path loss can be calculated by first calculating the total multipath distance (mp) using the following formula:

$$mp = m1 + m2 = \left(\frac{h1}{\cos\theta 1}\right) + \left(\frac{h2}{\cos\theta 2}\right)$$

Using the total multipath distance (mp) (in meters (m)) the path loss can be calculated by applying the free space path loss formula for electromagnetic waves as follows, where f is equal to the frequency of the radio wave and c is equal to the speed of light ($3 \times 10^8$ m/s).

$$FSPL_{mp} = \left(\frac{4\pi(mp)f}{c}\right)^2$$

The $FSPL_{mp}$ is provided in decibels and this value can be compared to the line of sight free space path loss to determine the Free Space Path Loss delta ($FSPL_\Delta$) between the two signals using the following formulas:

$$FSPL_{LoS} = \left(\frac{4\pi(d)f}{c}\right)^2$$

$$FSPL_\Delta = FSPL_{mp} - FSPL_{Los}$$

When defining the threshold for differentiation, the level needs to be set at a dB value between the $FSPL_{Los}$ and the $FSPL_{mp}$. The $FSPL_\Delta$ provides the range and accuracy required by the hardware in order to differentiate between the two signals. Depending on the frequency and distance this value can be large such that differentiation can be achieved with inexpensive radio components.

The preceding calculations assume a perfect reflector in a free space environment, but in reality the accuracy of these calculations are heavily based off the medium of reflection and external environmental factors. Based off our test data of two radios within close proximity, LoS communication, the effects of the environment can be approximated to account for a 10% error of the $FSPL_{mp}$. This environmental error coefficient (a) accounts for the various materials found in a standard office space (i.e. wood, carpet, cement) that might absorb some the magnitude of the incident wave and reflect the remaining. As a result, the $FSPL_\Delta$ can vary by an additional 10% from the ideal free space calculation. This new range ($PL_{\Delta ENV}$) includes the error that must be accounted for in the previous calculations to ensure that the threshold is set appropriately for differentiation between LoS and multipath. The following equation includes this new delta with the environmental coefficient ($\alpha$):

$$PL_{mpENV} = ((\alpha+1)*FSPL_{mp})$$

$$PL_{\Delta ENV} = PL_{mpENV} - FSPL_{Los}$$

Since this calculation is designed for close proximity communications, the environmental coefficient is only applied to the multipath and the LoS communications are assumed to remain in free space.

Using the equation for $PL_{\Delta ENV}$ a user can determine the maximum range possible for detection based off the expected environment. This range will vary depending on frequency, distance and medium of reflection. The user can calculate and design the best hardware solution to ensure accurate detection by varying the output power and receive sensitivity until the detection threshold lies within the range specified by $FSPL_{Los}$, $PL_{mpENV}$, and $PL_{\Delta ENV}$. Therefore, portable distance notification devices can be tailored to specific environments, such as the office, factory, construction site or warehouse to effectively address multipath signal and reduce erroneous user notifications resulting from such multipath signal.

In some embodiments, for example, the encoded signal generated by the signal component of the distance notification system has a frequency in the megahertz range. The encoded signal, for example, can have a frequency in the range of 300 MHz to 600 MHz or 300 MHz to 400 MHz.

Figure 2:
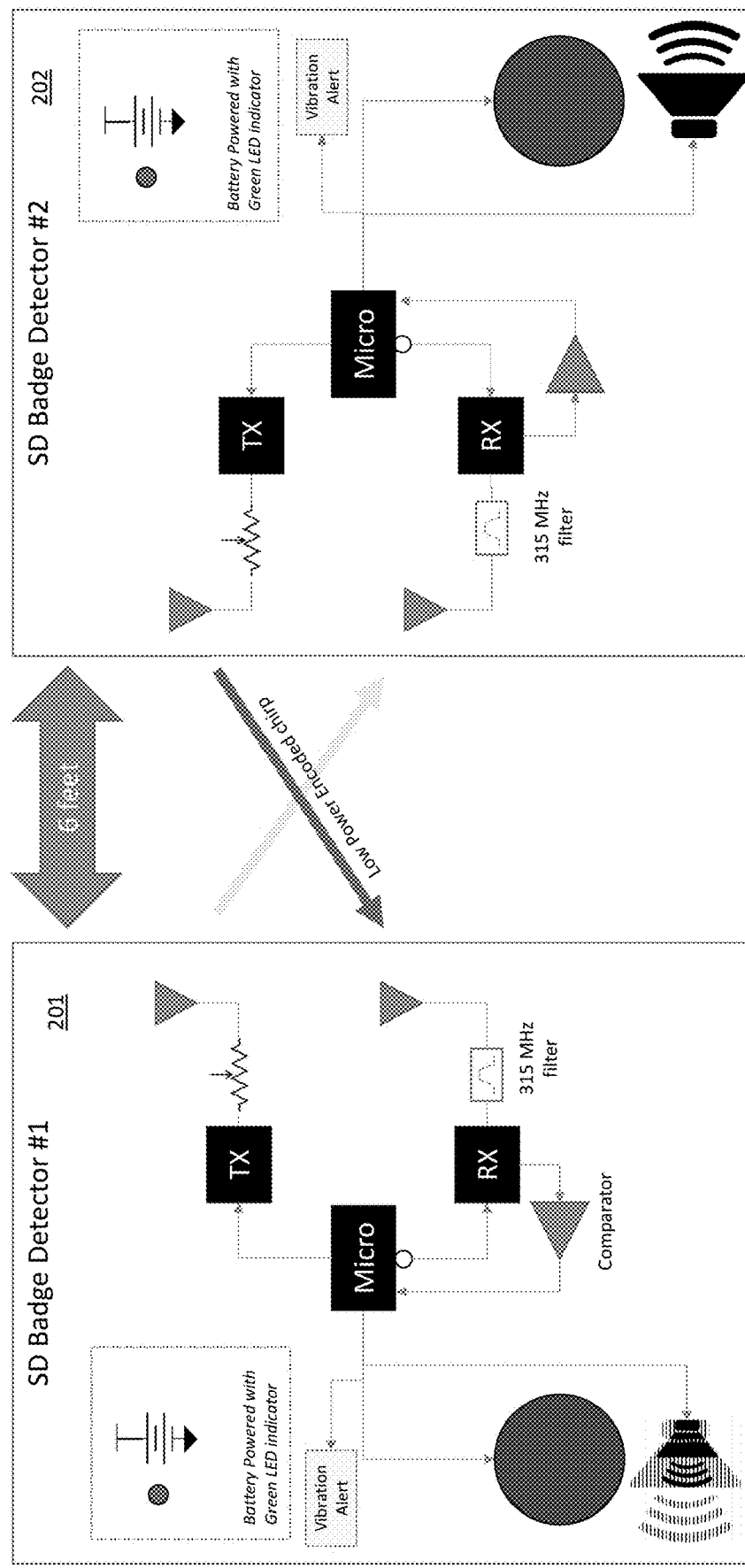
FIG. 2 illustrates a block diagram of a distance notification system, according to some embodiments.

FIG. 2 illustrates a block diagram of a distance notification system, according to some embodiments. As provided in FIG. 2, the distance notification system is configured as wearable or portable badges (201, 202). Each badge (201, 202) comprises signal generating (TX) and signal receiving (RX) components. The signal receiving components can employ one or more filters set to the frequency employed by the signaling component, such as 315 MHz in FIG. 2. Each badge (201, 202) also comprises at least one user notification generator. In the embodiment of FIG. 2, for example, each badge (201, 202) comprises a light indicator for visual notification and a speaker for audible notification. Signal processing (generation and receiving) is conducted with a processor (Micro) on the badges (201, 202).

Figure 3:
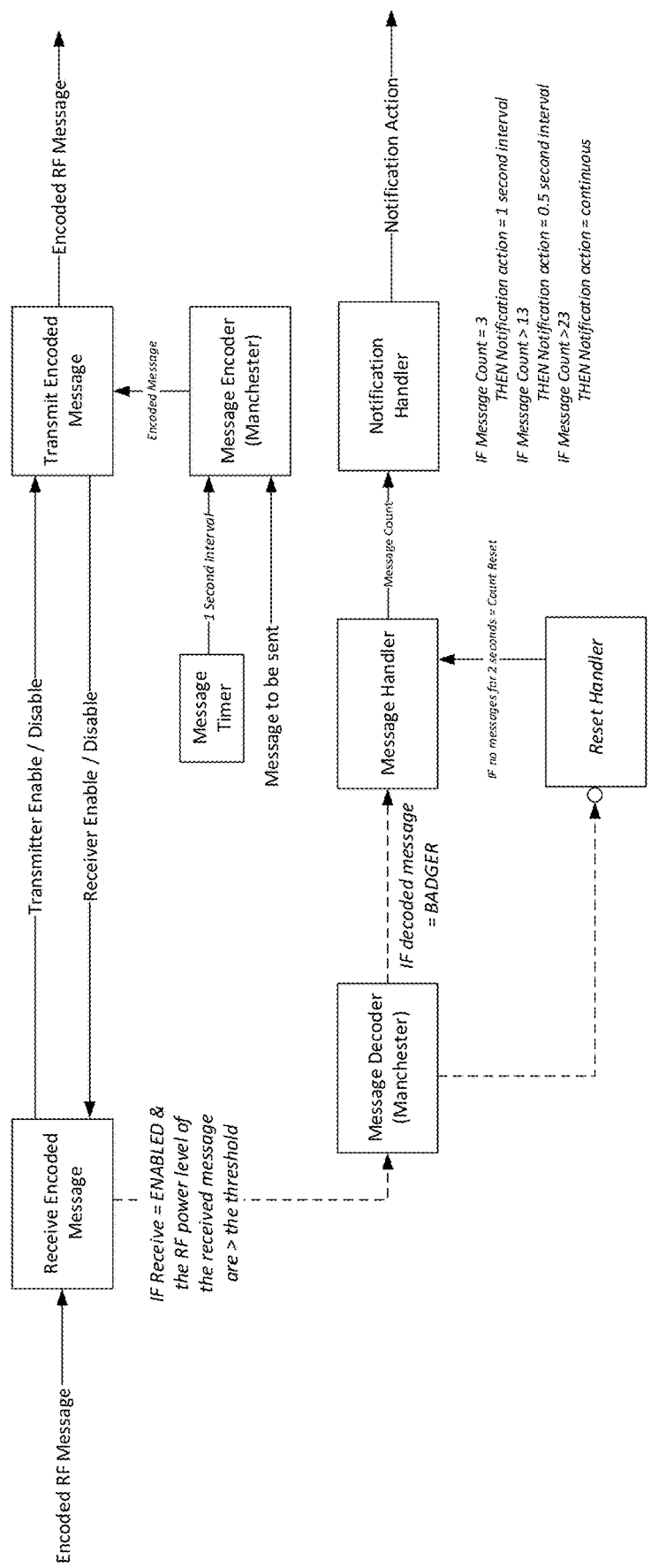
FIG. 3 is a flow chart detailing operation of a distance notification system described herein, according to some embodiments.

FIG. 3 is a flow chart detailing operation of a distance notification system described herein, according to some embodiments. As illustrated in FIG. 3, an encoded message is generated by the first badge (201) and received by the second badge (202). If the encoded radio frequency (RF) message has power in excess of the predetermined power threshold, the encoded RF message is sent to a message decoder. If the decoded message is correct, in this case the word "BADGER", the message proceeds to a message handler and on to the notification handler for providing system user notifications. In some embodiments, the number of messages passing to the notification handler is tabulated over a time period. In the embodiment of FIG. 3, if three messages are received, the system user notifications are provided at one second intervals until the badges (201, 202) are out of range to receive signal from one another exceeding the predetermined power threshold. As the message count increases, the interval of system user notifications is increased until the notifications are continuous. Intervals can be set to any desired periodic or aperiodic time period. Additionally, system user notification can be continuous.

The predetermined power threshold corresponds to a set distance between the badges (201, 202). When the badges (201, 202) are within the set distance, the encoded signal can exceed the power threshold. When outside the set distance, the encoded signal suffers sufficient free space path loss, thereby registering power falling below the predetermined power threshold. In this way, the power of the encoded signal in conjunction with the set distance establishes a safety perimeter around an individual or object wearing the signal component. Additionally, the predetermined power threshold is set to be sufficiently high to exclude multipath signal such that less than 10 percent or less than 5 percent of system user notifications are produced by multipath signal. In some embodiments, the analytical techniques described above can be employed to eliminate or reduce notification resulting from multipath signal. However, it is also contemplated that other mathematical solutions and design principles may be used to set the appropriate predetermined power threshold consistent with the technical objectives described herein.

Figure 4:
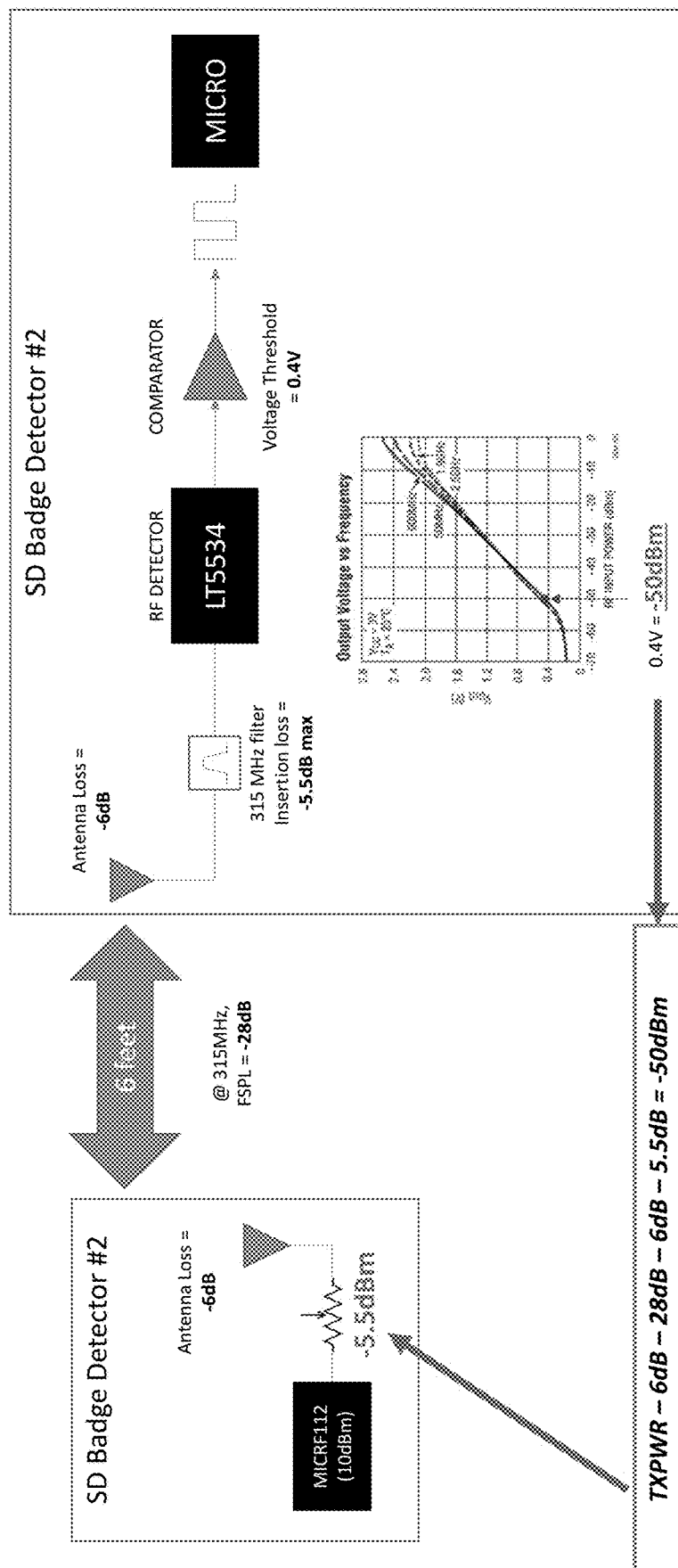
FIG. 4 illustrates an encoded signal power budget determination according to some embodiments.

The encoded signal power and set distance can be set according to the principles described herein. FIG. 4 illustrates an encoded signal power budget determination according to some embodiments. As provided in FIG. 4, the encoded signal power is determined according to several considerations including losses in various hardware signal generation and signal receiving components and the free signal path loss associated with the set distance of 6 feet. Moreover, multipath signal is addressed according to the disclosure above, resulting in less than 10 percent of system user notifications corresponding to encoded signal reflected from one or more surfaces. It is contemplated that distance notifications of various design can be developed according to principles described herein. Encoded signal strength, system components and set distance can each be varied according to desired system parameters in response to a variety of environments.

Referring once again to FIG. 3, the badges (201, 202) can each comprise functionality to enable and disable signal generation and signal receipt to preclude cross-talk within the local badge architecture.

In some embodiments, distance notification systems described herein can record and/or provide historical data detailing the number and/or frequency of user notifications provided by the systems. Such data can be used to monitor the ability of individuals to practice desired social distancing. Additionally, as described herein, distance notification systems can be applied to moving equipment in a number of environments, including factories, construction sites, warehouses, airports, and other logistical environments to ensure safe distances are maintained between pieces of equipment, as well as between pieces of equipment and personnel in the workspace. In some embodiments, information derived from distance notification systems described herein can be used to design increasingly safer workspaces. The information, for example, can be coupled with global positioning and/or local positioning data to identify workspace areas prone to close or dangerous contact between individuals and/or equipment.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A distance notification system comprising:
a signal component, and a receiving component for processing an encoded signal generated by the signal component into system user notifications, the encoded signal having power in excess of a predetermined threshold within a set distance between the signal component and the receiving component, wherein less than 10 percent of system user notifications are produced by the encoded signal reflected from one or more surfaces, wherein the predetermined signal power threshold is set to a decibel (dB) value between line of sight free space path loss and multipath free space path loss.

2. The distance notification system of claim 1, wherein less than 5 percent of system user notifications are produced by encoded signal reflected from one or more surfaces.

3. The distance notification system of claim 1, wherein the signal component and the receiving component are located within portable housings.

4. The distance notification system of claim 1, wherein the portable housings are wearable by individuals using the distance notification system.

5. The distance notification system of claim 1, wherein system user notifications comprise at least one of a visual notification, audible notification, and vibration.

6. The distance notification system of claim 1, wherein system user notifications are provided at predetermined intervals while the signal component and the receiving component are within the set distance.

7. The distance notification system of claim 1, wherein system user notifications are continuously provided while the signal component and the receiving component are within the set distance.

8. The distance notification system of claim 1, wherein the encoded signal has a frequency in the megahertz range.

9. The distance notification system of claim 8, wherein the frequency is in the range of 300 MHz to 600 MHz.

10. The distance notification system of claim 8, wherein the frequency is in the range of 300 MHz to 400 MHz.

11. The distance notification system of claim 1, wherein the set distance is at least 6 feet.

12. The distance notification system of claim 1, wherein the encoded signal establishes a safety perimeter around an individual or object wearing the signal component.

13. The distance notification system of claim 1, wherein the receiving component further comprises a recording component for recording history of the system user notifications produced by the receiving component.

14. The distance notification system of claim 1, wherein the history comprises number of system user notifications.

15. The distance notification system of claim 1, wherein the history comprises frequency of system user notifications.

16. The distance notification system of claim 1 further comprising a location positioning system in communication with the receiving component.

17. The distance notification system of claim 1, wherein the signal component generates encoded signal at periodic intervals.

18. The distance notification system of claim 1, wherein the signal component generates encoded signal at aperiodic intervals.

19. The distance notification system of claim 1, wherein the percent of system user notifications produced by encoded signal reflected from one or more surfaces is inversely proportional to a difference between the line of sight free space path loss and multipath free space path loss.

* * * * *